United States Patent
Cappi

[11] Patent Number: 5,526,696
[45] Date of Patent: Jun. 18, 1996

[54] FLOW METERS

[75] Inventor: James B. Cappi, Amberley, United Kingdom

[73] Assignee: Jordan Kent Metering Systems Limited, Wotton-under-Edge, United Kingdom

[21] Appl. No.: 232,097
[22] PCT Filed: Nov. 2, 1992
[86] PCT No.: PCT/GB92/02021
  § 371 Date: Apr. 29, 1994
  § 102(e) Date: Apr. 29, 1994
[87] PCT Pub. No.: WO93/09404
  PCT Pub. Date: May 13, 1993

[30] Foreign Application Priority Data

Nov. 2, 1991 [GB] United Kingdom ............ 9123357
Aug. 14, 1992 [GB] United Kingdom ............ 9217255

[51] Int. Cl.$^6$ ........................................ G01F 1/68
[52] U.S. Cl. ............................. 73/861.95; 73/861.04
[58] Field of Search ............... 73/204–13, 861.02, 73/861.95, 861.04

[56] References Cited

U.S. PATENT DOCUMENTS

| | | | |
|---|---|---|---|
| 2,772,567 | 12/1956 | Boden et al. | 73/861.02 |
| 2,799,165 | 7/1957 | Varvel | 73/861.95 |
| 3,604,263 | 9/1971 | Auphan et al. | 73/204.13 |
| 3,733,899 | 5/1973 | Auphan et al. | 73/204.13 |
| 4,704,904 | 11/1987 | McKie . | |

FOREIGN PATENT DOCUMENTS

| | | | |
|---|---|---|---|
| 0030253 | 6/1981 | European Pat. Off. . | |
| 2585465 | 1/1987 | France . | |
| 0144771 | 12/1978 | Japan | 73/861.95 |
| 55-062313 | 5/1980 | Japan . | |
| 0121115 | 9/1980 | Japan | 73/204.13 |
| 0127811 | 8/1982 | Japan | 73/204.13 |
| 1194998 | 11/1985 | U.S.S.R. . | |
| 1518499 | 10/1989 | U.S.S.R. . | |
| 1329051 | 9/1973 | United Kingdom . | |

OTHER PUBLICATIONS

By E. Brago et al., "System and Procedure for Measuring the throughput of Components in a Stream of a Gas Liquid Mixture", Apr. 1991, vol. 27, No. 4, pp. 136–138, with English translation.

*Primary Examiner*—Richard Chilcot
*Assistant Examiner*—Harshad Patel
*Attorney, Agent, or Firm*—Young & Thompson

[57] ABSTRACT

A temperature probe 3 determines the instantaneous ambient temperature of a multiphase fluid 2 flowing through a pipe 1, and at a position further downstream there is an inlet 4 for water at a constant temperature significantly different from that of the fluid 2 injected at timed intervals through a high pressure water jet nozzle 5. The effect of the jet is to mix the injected water intimately with the fluid 2 flowing through the pipe and create a localised pulse of heated (or cooled) fluid which then flows through the pipe 1 to be measured by a further temperature probe 10 and possibly by yet another probe 11 at positions downstream of the nozzle 5. The time taken for the localised heated pulse of fluid to travel along a fixed length of the pipe 1 can be measured, and will be a function of the rate of flow of the fluid through the pipe.

22 Claims, 2 Drawing Sheets

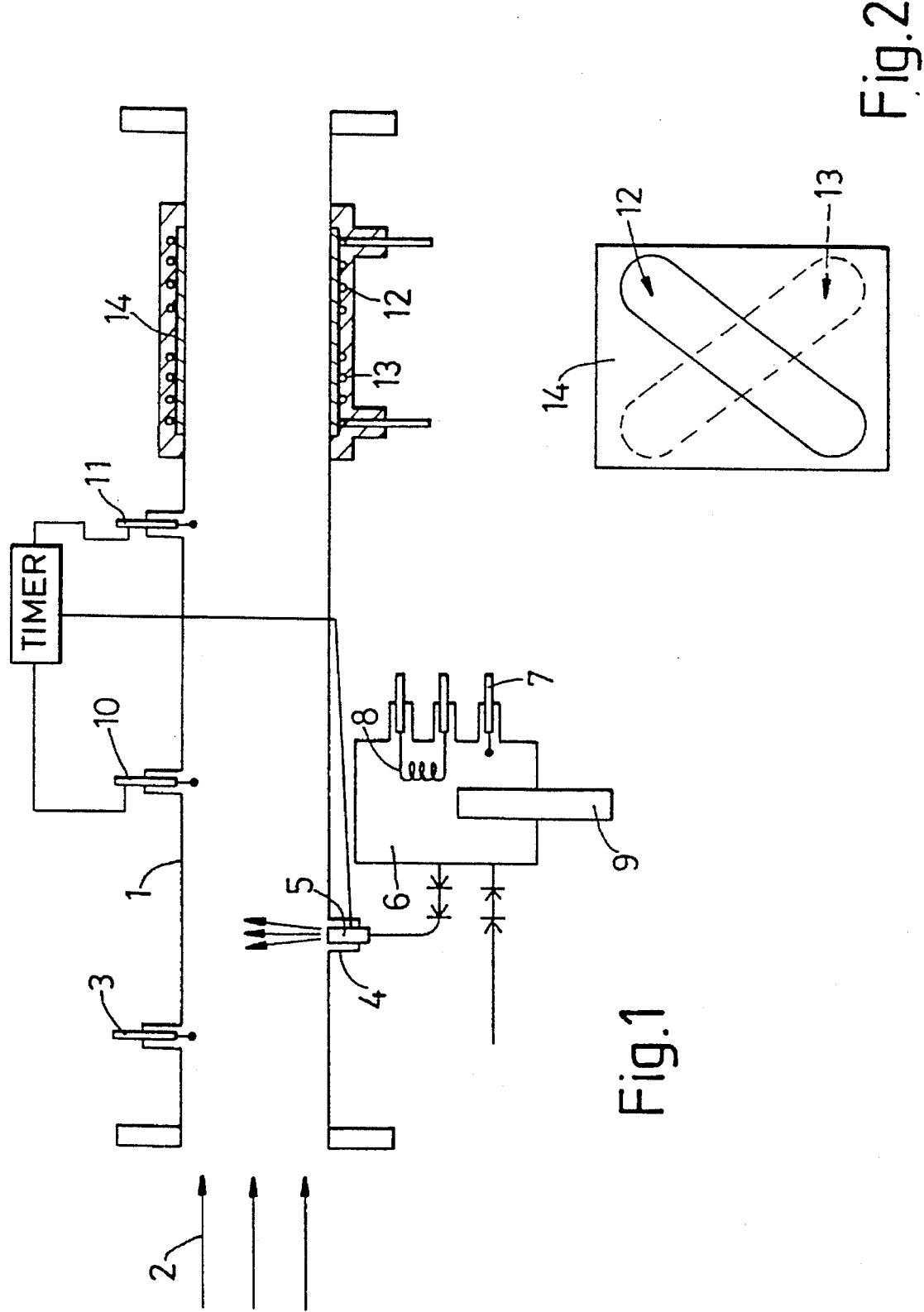

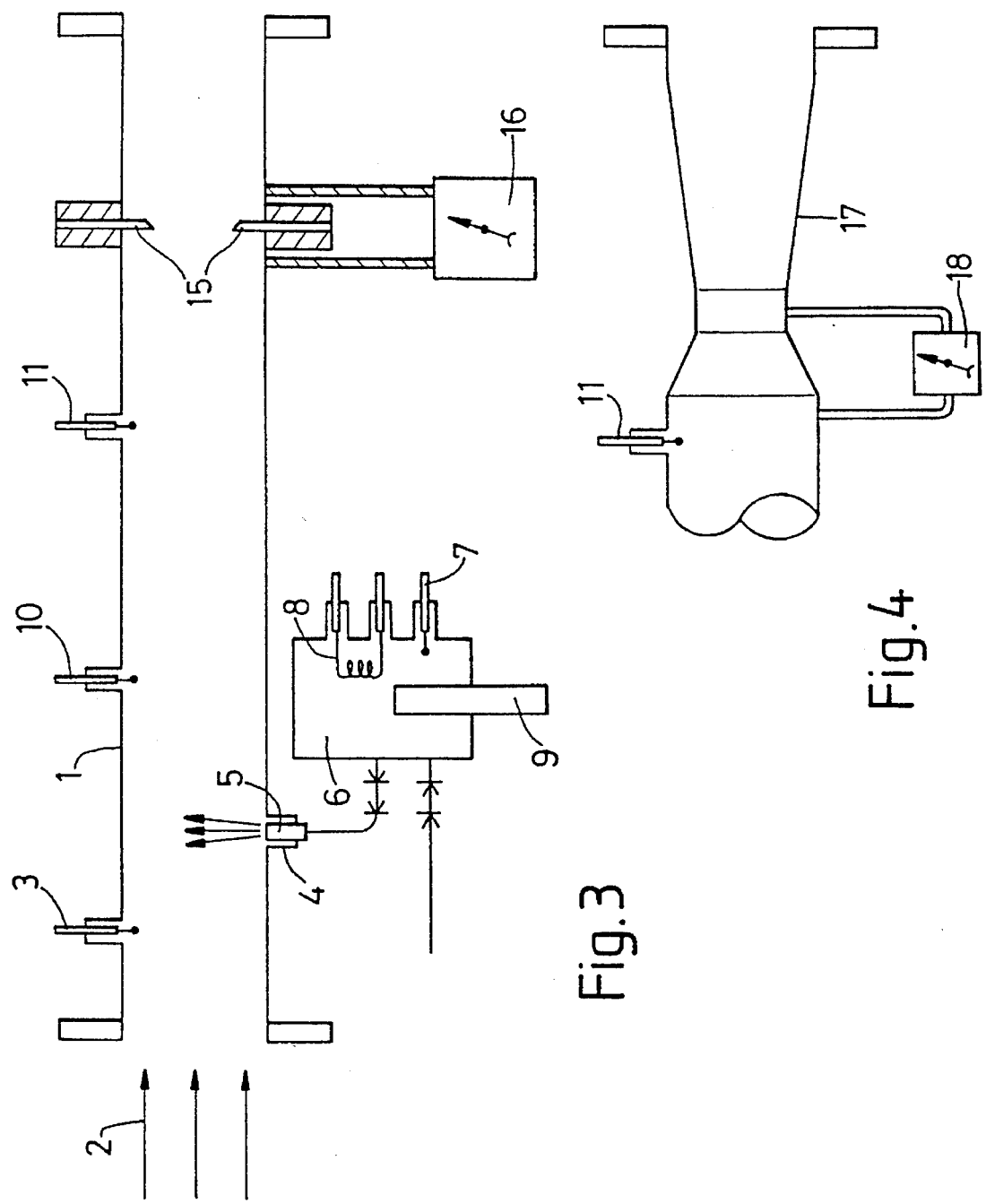

FLOW METERS

BACKGROUND OF THE INVENTION

Crude oil discharging from a production well is usually a mixture of oil and water or of oil, water and gas. It also frequently contains some sand, or similar particulates, which have been swept out of the rock formations by the fluid flow.

Normal practice is to discharge this mixture into a separating vessel where the various phases are separated by gravity into a gas flow, an oil flow, and a water flow which usually contains the sand. On a typical North Sea production platform there may be 20 wells discharging into a single separator. The single phase oil and gas flows discharging from the separator can be accurately metered for the purposes of custody transfer (sale) and taxation. Flow measured in this way measures the combined flow of all the wells together.

In order to best manage the oil field so as to maximise the recoverable reserves and/or minimise the cost it is necessary to know what flows are being produced by each well individually. This is currently achieved by the use of a "test separator" which is a smaller version of the separator previously referred to. Periodically each well will be connected to the test separator so that the flows of each phase can be measured from that well. This has the disadvantages that:

The test separator is heavy and costly;

The results are infrequent;

The manpower costs are high;

It is not suitable for sub-sea production systems.

The industry would like to have a flow meter that can be installed in each oil well flow line that can measure the flows of the three fluid phases, known as a multiphase flow meter, so as to provide continuous field management information. Ideally it should be capable of sub-sea installation. The accuracy does not need to be as high as for single phase metering, and a typical target is ±5%

Because of the importance of this topic it is the subject of considerable activity in the U.K. and elsewhere. Various techniques are being examined, but at this time there is no proven commercially available device.

The problem is a complex one, made even more complex by the behaviour of multiphase flow. When two or three fluid phases flow together in a pipe many types of flow pattern and distribution of phases are possible especially when one of the phases is a gas. Different behaviour is seen in horizontal pipes, pipes inclined up, pipes inclined down, and vertical pipes. Surges are common. It is also common for the different phases to travel at substantially different velocities and in particular for a gas phase to have a higher velocity in the pipe than the liquid phases.

SUMMARY OF THE INVENTION

According to the present invention there is provided a mixing and flow measurement device in a fluid flow pipe, comprising means for determining the ambient temperature of the main fluid comprising one or more fluid phases flowing through the pipe, an injection means for injecting a jet of a secondary fluid into the pipe to create intimate mixing of all the phases comprising the main fluid and intimate mixing of the secondary fluid with the main fluid, a source of the secondary fluid at a temperature substantially different from that of the ambient temperature of the main fluid and temperature measurement means within the flow pipe at one or more positions downstream from the injection means.

With such a device it is possible to utilise the secondary fluid as a tracer to track the movement of the main fluid through the flow pipe, the presence of the tracer at any location being detected by a temperature change from the ambient temperature of the main fluid, referred to as a temperature pulse. The movement of this temperature pulse through the flow pipe can be timed to enable a measurement of the velocity and the volumetric flow rate of the main flow to be calculated.

In accordance with another aspect of this invention there is provided a method of measuring the flow of a fluid in a fluid flow pipe, comprising the steps of determining the ambient temperature of the main fluid comprising one or more fluid phases flowing through the pipe, injecting a jet of a secondary fluid by injection means into the pipe to create intimate mixing of all the phases comprising the main fluid and intimate mixing of the secondary fluid with the main fluid, the secondary fluid being at a temperature substantially different from that of the ambient temperature of the main fluid, measuring the temperature of the fluid by temperature measurement means within the flow pipe at one or more positions downstream from the injection means, and calculating the flow rate of the main fluid by tracking the movement down the flow pipe of the temperature pulse created by the injection of the jet of secondary fluid by means of the temperature measurement means.

It is preferred that the injection means should incorporate one or more pressure nozzles in the wall of the pipe. This could be supplied with a secondary fluid by a ram which could be operated at timed intervals to inject the secondary fluid and create the temperature pulses. Alternatively a pressurised supply source with a control tap could be provided. Such nozzles could, for example, enter through the lower or upper wall of a horizontal flow pipe, probably at right angles to the pipe wall, but possibly angled into the downstream direction of the flow of fluid. Injecting the secondary fluid under pressure should produce good mixing so that the appearance of the temperature pulse at the temperature measurement means will be quite accurate, and so that a reasonably homogeneous mixture of the fluid phases within the main flow is produced and a reasonably homogeneous mixture of the main fluid and secondary fluid is produced and all fluid phases are caused to travel at substantially the same velocity.

There will, ideally, be a timing arrangement for determining the movement of the temperature pulse between two fixed points. These could be the injection point for the secondary fluid and a single temperature measurement means downstream of the injection point. Alternatively two spaced temperature measurement means could be provided with the timing arrangements calculating the time of arrival of the temperature pulse at each of the two temperature measurement devices respectively.

If there are at least two temperature measurement devices one of which measures the ambient temperature of the main fluid then additional temperature measurement can be achieved on the basis of the change in temperature measured between the two measuring devices. This temperature change together with knowledge of the volumetric flow rate of the main fluid, the temperature and specific or latent heat of the secondary fluid and the rate of injection of the secondary fluid enables the heat capacity per unit volume of the main fluid to be calculated. Alternatively recording of the temperature changes at one of the temperature measuring devices downstream of the injection point of the secondary fluid over the whole interval of time during which a temperature pulse passes the temperature measuring device, together with knowledge of the volumetric flow rate of the main fluid, and the temperature, specific or latent heat and quantity of injected secondary fluid enables the heat capacity per unit volume of the main fluid to be calculated. Another possibility is to calculate the heat capacity on the basis of the temperature recorded when a steady state condition is achieved during injection of the secondary fluid at a continuous steady rate. A resistance thermometer would be ideally suited for this task as it can produce a very accurate temperature measurement, although it has a slow response time.

A further measurement, of electrical capacity, can be achieved by suitable means which will measure the di-electrical constant of the fluid flowing through the pipe. If this measuring device is situated downstream of the injection means the accuracy of the reading will be enhanced because the mixed pulse of fluid will be more intimately mixed and of more uniform velocity than elsewhere in the main fluid path. Furthermore fluid density could be measured by suitable means, as an alternative to measurement of electrical capacity.

When fluid flow comprises two or more fluid phases typically each of the fluid phases have distinctly different values of heat capacity with respect to volume, di-electric constant and density. Measurement of one or more of the heat capacity, di-electric constant and density of the fluid mixture enables the volume fraction of each of the individual phases in a two or three phase mixture to be calculated.

Density of a fluid mixture may be measured by utilising a head loss (or pressure loss) device such as an orifice plate, a classical venturi tube, a nozzle, a venturi nozzle, or any other similar device capable of measuring by pressure loss techniques the momentum flux in the pipe. (Momentum flux equals average density of the fluid X average velocity in the pipe X average velocity in the pipe). Such devices are commonly used to determine mass flux in a pipe from which velocity is calculated where the fluid density is known. In this application, where fluid velocity can be calculated by the method already described, by timing the travel of the temperature pulse, a momentum flux measuring device can be used to determine the fluid density.

When a density measuring means is included in the device the mass flow rate of fluids in the pipe can be determined as an alternative to volumetric flow rate. When fluid flow comprises two or more fluid phases, typically the fluid phases have distinctly different values of heat capacity with respect to mass, di-electric constant and density. Measurement of one or more of the heat capacity, di-electric constant and density of the fluid mixture enables the mass faction of each of the individual phases in a two or three phase mixture to be calculated.

All calculations of volumetric or mass flow rate, heat capacity (with respect to volume,or mass), density and di-electric constant can readily take into account the known quantity or rate of secondary fluid injected so as to arrive at values for the main fluid only.

It is well known that in the case of two phase fluid flow, only one measurement of the main fluid physical properties is required to calculate the volume or mass fractions of the constituent fluids. In this case only measurement of heat capacity (with respect to volume or mass as appropriate) or di-electric constant or density will be required. It is also well known that in the case of three phase fluid flow any two measurements of the main fluid properties can be made in order to calculate the volume or mass fractions of the constituent fluids. In each case the measurement of heat capacity (with respect to volume or mass), or density or di-electric constant can be substituted by another measurement sensitive to the volume or mass fractions of the main fluid.

The invention can also be applied to multiphase flow where one of the phases is a particulate solid provided the particles are sufficiently small as to permit rapid heat transfer between the secondary fluid and the solid.

BRIEF DESCRIPTION OF THE DRAWINGS

The invention may be performed in various ways and one specific embodiment will now be described, by way of example, with reference to the accompanying drawings, in which:

FIG. 1 is a diagrammatic illustration of a flow measurement device of this invention;

FIG. 2 is a view of a typical capacitance measuring system of the device;

FIG. 3 illustrates a modification of the tail end of the device shown in FIG. 1; and FIG. 4 shows an alternative construction of the tail end of the device of FIG. 3.

DETAILED DESCRIPTION OF THE INVENTION

As shown in FIG. 1, a flow pipe 1 is provided for the transmission of a fluid 2, for example the water, oil and gas mixture produced by an oil well. A temperature probe 3 is provided to determine the instantaneous ambient temperature of the fluid flowing through the pipe. At a position downstream from the temperature probe 3 there is an inlet 4 for a high pressure water jet nozzle 5. Water is supplied from a reservoir 6 where it is maintained at a constant temperature (as determined by a temperature probe 7) by means of a heater 8. At timed intervals a ram 9 is actuated to cause a measured jet of water from the reservoir 6 to be injected through the jet 5 into the pipe 1. The effect of the jet is to mix the injected water intimately with the fluid 2 flowing through the pipe. It also has the effect of mixing the fluid itself into a more homogeneous state at that discrete position in the flow volume and to equalise the velocity of the phases. The temperature of the water within the reservoir 6 is maintained at a level substantially higher than that of the ambient temperature of the fluid 2 so that the injection of the pulse of heated water creates a localised heating of the fluid 2 flowing through the pipe. This localised temperature pulse can then be measured by means of a further temperature probe 10 and possibly by yet another probe 11 at positions downstream of the nozzle 5. The time taken for the localised heated pulse of fluid to travel along a fixed length of the pipe 1 can be measured. This measurement could be between the instants between injection of water through the nozzle 5 and the registering of the temperature increase at the temperature probe 10 or the time between registration of the increase in temperature at the temperature probes 10 and 11 respectively. The time taken for the heated pulse of fluid to pass down the measured length of pipe will be a function of the rate of flow of the fluid through the pipe.

It will be appreciated that, where the ambient temperature of the fluid 2 (as measured by the temperature probe 3) is relatively high, a pulse of water at a significantly lower temperature could be injected. There would then be no need to provide the water heater 8. The temperature probes 10 and 11 would then be registering a negative heat pulse. The method of supply, temperature control and injection of the water through the nozzle 5 is not critical and many other methods may be employed. Furthermore, liquids other than water (or gases or fluid mixtures) could be injected through the nozzle 5 to create the required high pulse in the passing flow of fluid 2.

Typically, the temperature difference between the ambient temperature of the fluid 2 and the injected pulse of a secondary fluid will be about 80° C. For a large pipe (of 150 mm diameter) where the main fluid flow is typically 100 liters per second a water injection rate of about 1 liter per second would be suitable. For application to fluid flow obtained from a hot oil well (typically 100° C. or more for a North Sea oil well) cold water, ideally at a known temperature, can be employed for injection through the jet 5. In a preferred example, a heat pulse of 1 second duration could be injected at say every 100 seconds. The overall level of water injected would then comprise 0.01% of the pipe mass flow which would not, therefore, create any significant effect compared with the water already in the liquid flowing from a conventional oil well. The water will be injected into the pipe through a nozzle in the pipe wall designed to break up the water into fine droplets and to provide a violent swirl mixing of the pipe contents. An injection pressure of some 50 or 100 bar higher than the pipe pressure is expected to provide adequate energy to produce good mixing. This system will provide rapid heat transfer and reasonable homogeneity for the subsequent measurement.

In an alternative arrangement there may be two sources of secondary fluid, the first at a similar temperature to the ambient temperature of the main fluid and the second at a substantially different temperature. In this embodiment the first source of fluid may be injected for a short period prior to the second source of fluid so as to stabilise the flow conditions within the pipe before the second source of fluid, which generates the temperature pulse, is injected. In yet another alternative the first source of fluid may be injected continuously so as to provide continuous mixing.

Alternatively, the first and second sources of fluid can be alternated so that a secondary fluid is being continuously injected into the pipe but at different temperatures according to whether the fluid is from the first source or the second source.

In yet another alternative, a single source of secondary fluid can be injected into the pipe, either continuously or intermittently, but its temperature may be varied by switching the power level of an electrical heater between a high level and a low level (which may be zero), the heater being located in the fluid source outside the pipe.

In each of these alternatives a temperature pulse (positive or negative) is created in the pipe and the fluids in the pipe are mixed whenever a secondary fluid is being injected into the pipe.

Other methods of creating upstream mixing may be employed. This may be achieved by installing a suitable mixing device upstream of the multiphase flow meter for this purpose, or, alternatively, locating the meter immediately downstream of a device needed in the pipeline for other purposes, such as a pressure reducing device, which provides mixing as part of its function.

The only obstructions in the pipe are the temperature probes 3, 10 and 11 (for example thermocouples) which protrude into the interior of the pipe. If necessary these probes can be arranged to retract and advance, for example for each measuring pulse, or to be retracted for any pipe cleaning operations.

Measurement of the temperature rise or integration of the temperature rise and fall curve will enable the fluid heat capacity with respect to volume to be calculated. The heat contained in the water pulse is determined from the injected water temperature and volume. The electrical capacity of the fluid 2 can also be determined by measurement of the di-electric constant by means of a pair of helically laid coils 12, 13 (see also FIG. 2) carried on a former 14 laid around the pipe 1.

The determination of the features of volume flow rate, overall heat capacity with respect to volume and electrical capacity enables a calculation to be made of the respective volume quantities of the three phases within the fluid 2 (for example gas, oil and water) since these phases will have relatively different fluid heat capacities with respect to volume and electrical capacities.

Specific embodiments of the use of pressure loss devices in substitution for the measurement of di-electric constant are illustrated in FIGS. 3 and 4. FIG. 3 illustrates the use of an orifice plate 15 together with a meter 16 for measuring the pressure drop across the orifice plate. In the case of using an orifice plate it may be installed in a device which permits the orifice plate to be removed through the side of the pipe without dismantling the pipe, to allow inspection or replacement of the orifice plate or the removal of the obstruction of the orifice plate for the purpose of cleaning the pipe.

FIG. 4 illustrates the use of a classical venturi tube 17 together with a meter 18 for measuring the pressure drop across the venturi. There are several means of measuring the pressure drop across these devices and several methods of detecting the upstream and downstream pressures and the invention is not limited to any particular method. FIGS. 3 and 4 illustrate the pressure loss device downstream of the other parts of the multiphase flow meter, but it could be located upstream of the other parts, or at some intermediate location between upstream and downstream.

The determination of the features of fluid velocity, overall heat capacity with respect to mass and density enables a calculation to be made of the respective mass quantities of three different phases within the fluid 2 (for example gas, oil and water) since these phases will have relatively different fluid heat capacities with respect to mass and densities.

Alternatively, the same device employing a temperature pulse and pressure loss device can be used to determine the features of volume flow rate, overall heat capacity with respect to volume and density and by appropriate mathematical solution calculation can be made of the respective volume quantities of the three phases within the fluid 2.

I claim:

1. A device for measuring the volumetric flow rate of a main fluid comprising at least two fluid phases flowing through a fluid flow pipe, comprising first temperature measurement means for determining the ambient temperature of said main fluid, means for supplying a secondary fluid at a temperature substantially different from that of the ambient temperature of said main fluid, pressure nozzle injection means for injecting a jet of said secondary fluid into the pipe in such a manner as to create intimate mixing of all of the phases comprising said main fluid and intimate mixing of said secondary fluid with the mixed phases of the main fluid, thereby causing all fluid phases to travel at substantially the same velocity across the circumference of the flow pipe, to create a temperature pulse slug, further temperature measurement means for measuring the temperature of the intimately mixed fluid within the flow pipe at at least one position downstream from the injection means, and timing means for determining the flow time down the flow pipe of the temperature pulse.

2. A device as claimed in claim 1 wherein the injection means is provided by a pressurised supply source with a control tap.

3. A device as claimed in claim 1, wherein said temperature measurement means comprises a resistance thermometer.

4. A device as claimed in claim 1, further comprising a ram for supplying a secondary fluid to the pressure nozzle at timed intervals to create the temperature pulses of the injected secondary fluid.

5. A device as claimed in claim 1, wherein the pressure nozzle enters through one of the lower and upper wall of a horizontal flow pipe at an angle to the pipe wall, into the downstream direction of the flow of fluid.

6. A device as claimed in claim 1, wherein there are two further temperature measurement means spaced along the pipe and the timing means is set to record the time of arrival of the temperature pulse at each of the two further temperature measurement means respectively.

7. A device as claimed in claim 1, wherein means are provided to measure the di-electrical constant of the fluid flowing through the pipe.

8. A device according to claim 1, wherein a fluid density measurement device is additionally incorporated in the flow pipe.

9. A device according to claim 8, wherein the fluid density measurement device comprises a head loss device selected from the group consisting of an orifice plate, a venturi tube, a nozzle, a venturi nozzle, and a device capable of measuring by pressure loss techniques the momentum flux in the pipe.

10. A method of measuring the volumetric flow rate of a main fluid comprising at least two fluid phases flowing through a fluid flow pipe, comprising the steps of determining, by means of first temperature measurement means, the ambient temperature of said main fluid, supplying a secondary fluid at a temperature substantially different from that of the ambient temperature of said main fluid, injecting a jet of said secondary fluid by pressure nozzle injection means into the pipe in such a manner as to create intimate mixing of all of the phases comprising said main fluid and intimate mixing of said secondary fluid with the mixed phases of the main fluid, thereby causing all fluid phases to travel at substantially the same velocity across the circumference of the flow pipe, to create a temperature pulse slug, measuring the temperature of the intimately mixed fluid in the temperature pulse slug by further temperature measurement means within the flow pipe at at least one position downstream from the injection means, and calculating the volumetric flow rate of said main fluid by determining the flow time down the flow pipe of the temperature pulse.

11. A method as claimed in claim 10 wherein a ram is provided for supplying the secondary fluid to the pressure nozzle at timed intervals to create the temperature pulses of the injected secondary fluid.

12. A method as claimed in claim 10, wherein the pressure nozzle enters through one of the lower and upper wall of a horizontal flow pipe at an angle to the pipe wall into the downstream direction of the flow of fluid.

13. A method as claimed in claim 10, wherein there are two further temperature measurement means spaced along the pipe and a timing device is provided for calculating the time of arrival of the temperature pulse at each of the two further temperature measurement means respectively.

14. A method as claimed in claim 10, wherein the electrical capacity of the main fluid is additionally calculated by means which measures the di-electrical constant of the fluid flowing through the pipe.

15. A method according to claim 10, wherein fluid density is determined by a fluid density measurement device which is additionally incorporated in the flow pipe.

16. A method according to claim 15, wherein the fluid density measurement device comprises a head loss device selected from the group consisting of an orifice plate, a venturi tube, a nozzle, a venturi nozzle, and a device capable of measuring by pressure loss techniques the momentum flux in the pipe.

17. A method according to claim 15, wherein the reading from the density measurement device is used to determine the mass flow rate of fluids in the pipe.

18. A method according to claim 10, further comprising: providing an additional temperature measurement means to measure the temperature of said secondary fluid prior to injection thereof, recording the temperatures measured by (A) said first temperature measurement means, (B) said further temperature measurement means and (C) said additional temperature measurement means, determining a first temperature difference (D) between the ambient temperature of said main fluid and the temperature of said temperature pulse slug passing said further temperature means, determining a second temperature difference (E) between the temperature of said secondary fluid and the maximum temperature of said temperature pulse slug passing said further temperature measurement means, measuring the rate of injection (F) of said secondary fluid, determining the specific heat (G) of said secondary fluid, and calculating the heat capacity per unit volume of said main fluid from the information (A) to (G) together with said calculated volumetric flow rate of the main fluid.

19. A method according to claim 10, further comprising: providing an additional temperature measurement means to measure the temperature of said secondary fluid prior to injection thereof, recording the temperatures measured by (A) said first temperature measurement means, and (B) said additional temperature measurement means, determining the temperature change (C) over the whole of the interval of time during which said temperature pulse slug passes said further temperature measurement means, measuring the quantity (D) of said secondary fluid, determining the specific heat (E) of said secondary fluid and calculating the heat capacity per unit volume of said main fluid from the information (A) to (E), together with said calculated volumetric flow rate of the main fluid.

20. A method according to claim 10, further comprising: providing an additional temperature measurement means to measure the temperature of said secondary fluid prior to injection thereof, recording the temperatures measured by (A) said first temperature measurement means, and (B) said additional temperature measurement means, choosing the length of time of injection of the temperature pulse slug such that a steady state temperature measurement reading (C) is achieved at said further temperature measurement means, determining the specific heat (D) of the secondary fluid, and calculating the heat capacity per unit volume of the main fluid from the information (A) to (D), together with said calculated volumetric flow rate of the main fluid.

21. A method according to claim 10 wherein said main fluid comprises two fluid phases, said method further comprising calculating the heat capacity of the main fluid, and measuring an additional physical property of the main fluid, said additional physical property being selected from heat capacity, electrical capacity by means which measure the di-electric constant of the fluid flowing through the pipe, and the fluid density by means of a fluid density measuring device incorporated in the flow pipe, and using said measured additional physical property of the main fluid to calculate one of the mass and volume fraction of each of the individual phases in the main fluid.

22. A method according to claim 10 wherein said main fluid comprises three fluid phases, said method further comprising calculating the heat capacity of the main fluid, and measuring two additional physical properties of the main fluid, said two additional physical properties being selected from heat capacity, electrical capacity by means which measures the di-electric constant of the fluid flowing through the pipe, and the fluid density by means of a fluid density measuring device incorporated in the flow pipe, and using said two measured physical properties of the main fluid to calculate one of the mass and volume fraction of each of the individual phases in the main fluid.

* * * * *